United States Patent [19]

Maynard

[11] 4,215,731
[45] Aug. 5, 1980

[54] ROUTER GUIDE ASSEMBLY

[76] Inventor: Douglas E. Maynard, 13216 Leach St., Sylmar, Calif. 91342

[21] Appl. No.: 972,932

[22] Filed: Dec. 26, 1978

[51] Int. Cl.³ .............................................. B27G 13/00
[52] U.S. Cl. .................... 144/136 C; 83/471.2; 83/574; 144/134 D
[58] Field of Search ............ 83/574, 471.2, 451, 83/452, 453, 454, 477, 477.1, 483, 484, 485, 613, 614, 743, 745; 144/134 R, 134 A, 134 D, 136 R, 136 C, 323

[56] References Cited

U.S. PATENT DOCUMENTS

| | | | |
|---|---|---|---|
| 2,521,862 | 9/1950 | McCarthy | 83/485 |
| 2,683,489 | 7/1954 | Jackman | 83/485 |
| 2,708,463 | 5/1955 | Coleman | 83/574 |
| 3,344,824 | 10/1967 | Greco | 83/574 |
| 3,368,594 | 2/1968 | Drumbore | 83/574 |
| 3,418,883 | 12/1968 | Leibow | 144/134 R |
| 3,770,031 | 11/1973 | Olson | 83/471.2 |
| 4,163,404 | 8/1979 | Lavis | 83/574 |

Primary Examiner—W. Donald Bray
Attorney, Agent, or Firm—Allan M. Shapiro

[57] ABSTRACT

Work table has fence thereon for supporting and locating workpiece. Hold-down bars and guide bars are secured to a mounting bar and are movable so that the hold-down bars lie across the workpiece. A carriage is movably mounted on the guide bars and is arranged to carry a router across the workpiece so that the workpiece can be routed.

8 Claims, 6 Drawing Figures

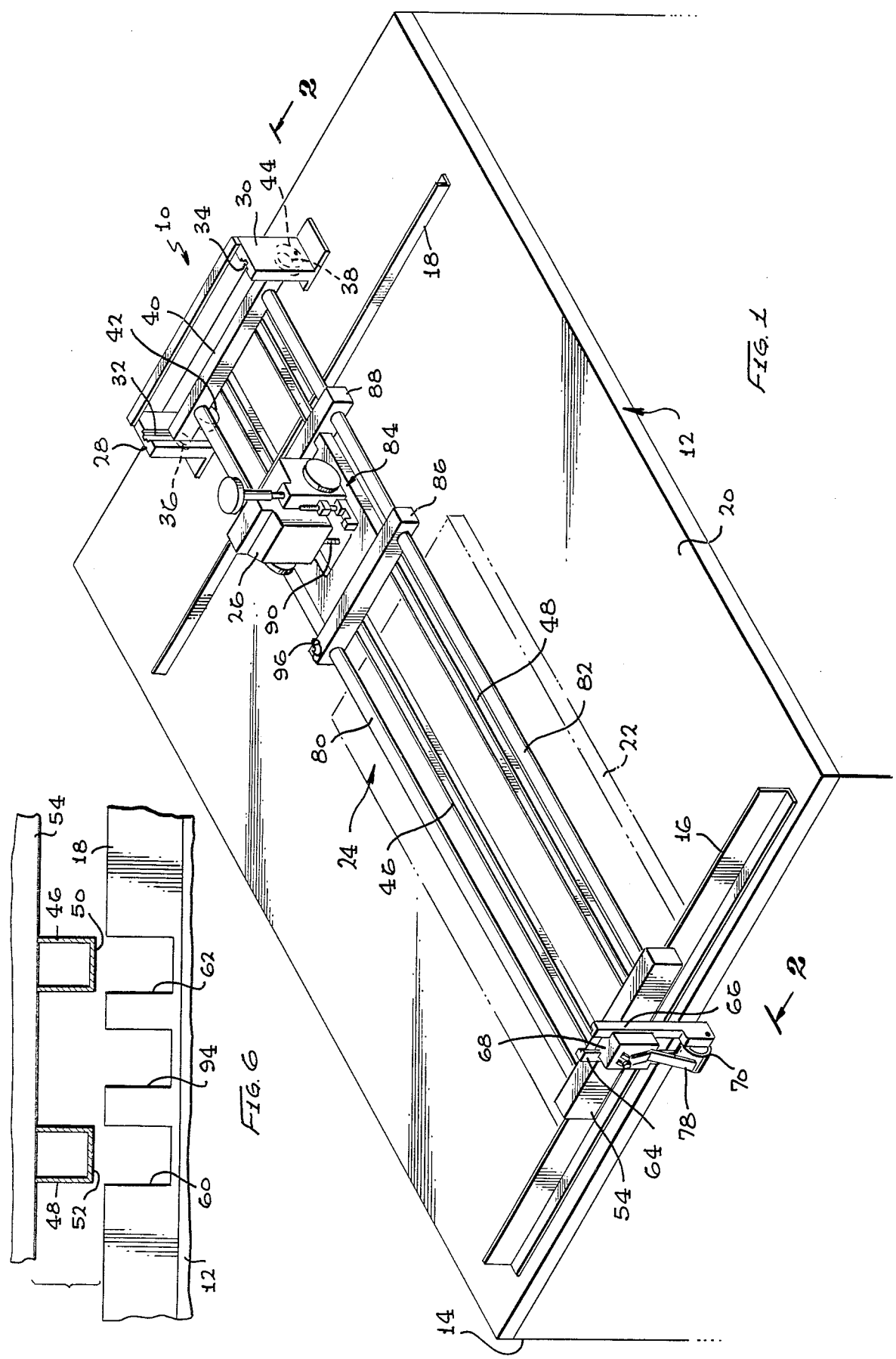

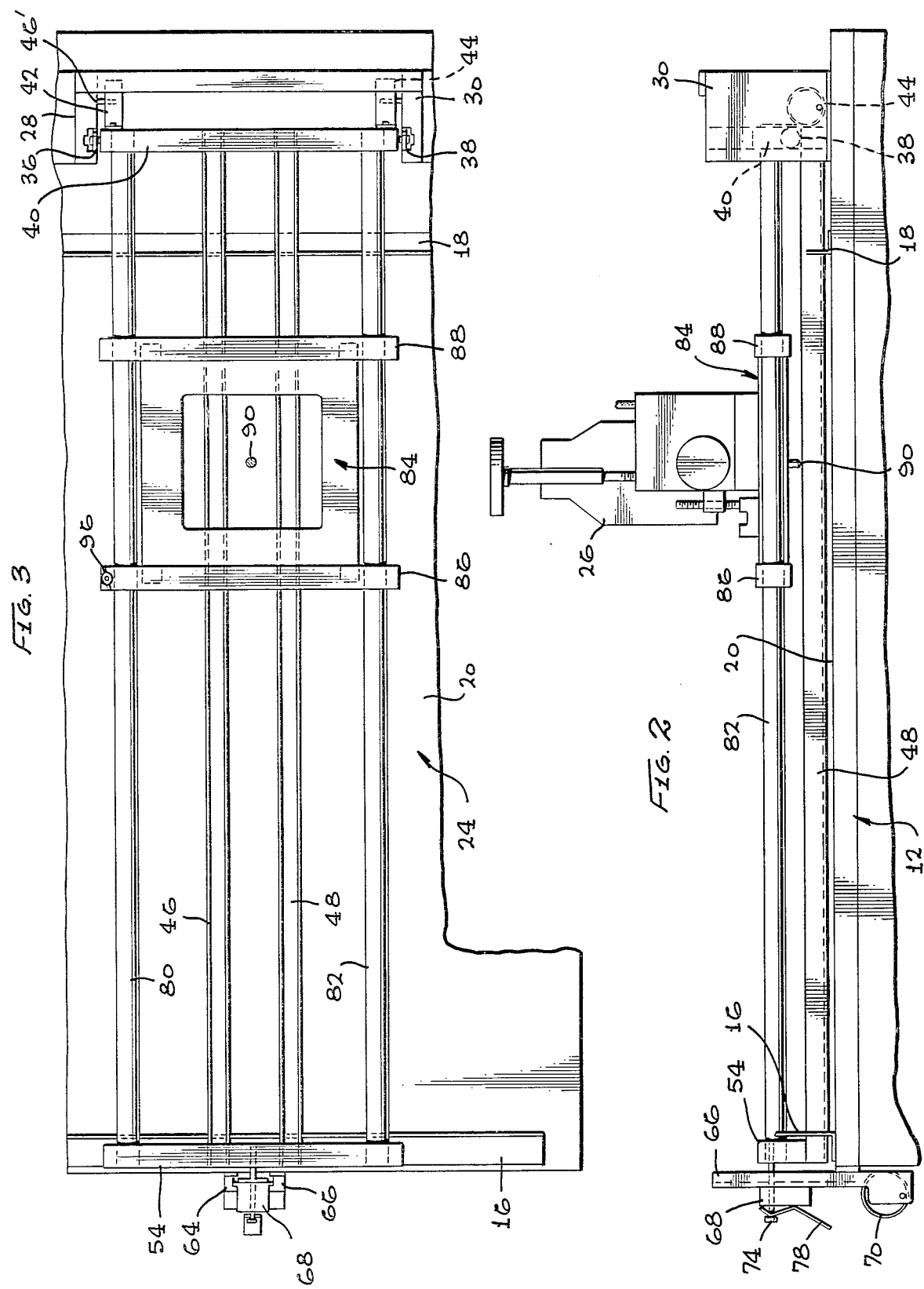

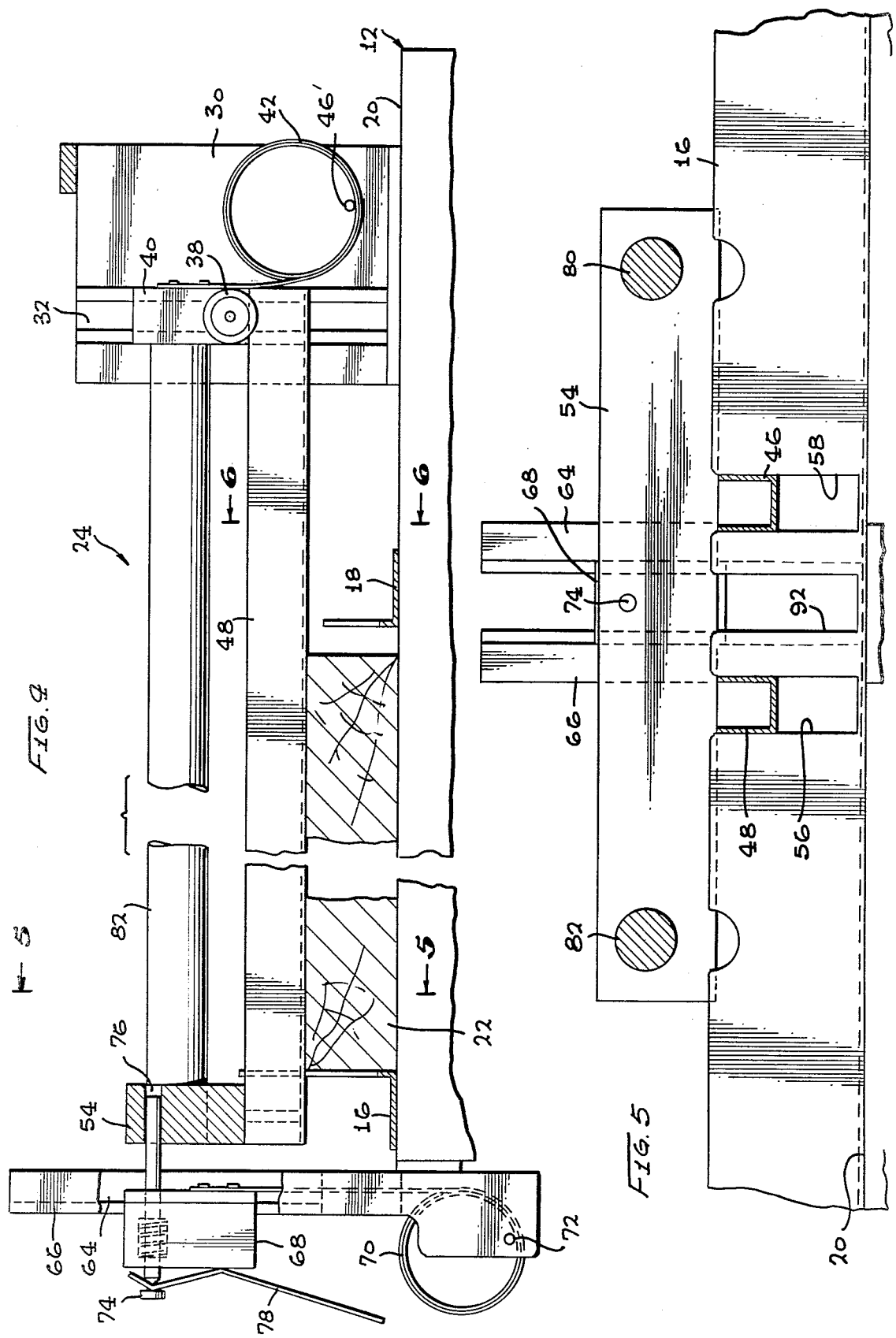

ROUTER GUIDE ASSEMBLY

BACKGROUND OF THE INVENTION

1. Field of the Invention

This invention is directed to an assembly which restrains a workpiece and guides a router so that a routed surface can be cut on the workpiece.

2. Description of the Prior Art

The large millwork shop has a well-known, large wood-working router. This is a flat table machine with a router bit extending upward above the table surface. Adjustable fences control and guide the workpiece past the router bit. Such machinery is accurate, but in view of its size, it can only be conveniently used in a fixed position in a millwork shop. Furthermore, such equipment is expensive and thus is installed only when a considerable amount of routing-type millwork need be done.

In order to overcome the drawbacks of the non-portable size of the large equipment-type of router and the expense thereof, portable, hand-operable routers have become available. These routers are both portable and inexpensive so that they can be widely used. They are conventionally equipped with a small guide fence carried on the router, but this fence requires an edge on the workpiece for self-guiding of the router. Thus, such a fence is useful only in a limited number of applications. Accordingly, there is need for a guide assembly whereby a router can be guided with respect to a workpiece.

SUMMARY OF THE INVENTION

In order to aid in the understanding of this invention, it can be stated in essentially summary form that it is directed to a router guide assembly wherein a table is provided with a fence and a carriage is movably mounted with respect to the fence, the carriage being arranged to carry a portable router thereon so that such a router can be guided with respect to a workpiece which lies on the table against the fence.

It is thus an object of this invention to provide a router guide assembly wherein a portable router can be mounted on a carriage and the carriage moves with respect to the workpiece so that the router accurately routes a surface on the workpiece. It is another object to provide a router guide assembly wherein a hold-down bar engages the workpiece and restrains the workpiece while a router-carrying carriage moves across the workpiece so that the workpiece is restrained while the router is moved thereacross. It is another object to provide a router guide assembly which is inexpensive and is arranged so that it can be used with modern, portable hand-operated routers so that it can be widely used. It is another object to provide a router guide assembly which is portable so that it can be conveniently carried to a workplace.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a isometric view of the router guide assembly of this invention.

FIG. 2 is an enlarged side-elevational view, seen from generally along the line 2—2 of FIG. 1.

FIG. 3 is a plan view of the router guide assembly, to the same scale as in FIG. 3.

FIG. 4 is a further enlarged side-elevational view of the router guide assembly, with parts broken away and parts taken in section.

FIG. 5 is a section taken generally along the line 5—5 of FIG. 4.

FIG. 6 is a section taken generally along the line 6—6 of FIG. 4, with parts broken away.

DESCRIPTION OF THE PREFERRED EMBODIMENT

As is best seen in FIG. 1, the router guide assembly 10 of this invention is mounted on table 12 which is supported from the floor by means of support 14. Support 14 may be table legs or other supporting hardware. Furthermore, table 12 may be laid on top of an independent supporting structure, such as sawhorses or a work bench. Front and rear fences 16 and 18 are mounted on the flat top surface 20 of table 12. Fences 16 and 18 are parallel to each other and define stops against which a workpiece may be positioned. Workpiece 22 is illustrated as lying on surface 20 and engaging against front fence 16.

Guide assembly 24 has the function of guiding router 26 with respect to table 12 and the fences thereon, and also has the function of clamping the workpiece in place sufficiently so that normal routing forces do not move the workpiece from position. Guide assembly 24 is supported on its rear end with respect to table 12 by means of facing stands 28 and 30 which are secured to the top surface of table 12. Stands 28 and 30 respectively carry upright slots 32 and 34 which respectively receive rollers 36 and 38. Rollers 36 and 38 are mounted on the ends of crossbar 40 so that the crossbar 40 can move up and down in slots 32 and 34 with respect to table 12. Coil springs 42 and 44 are attached on crossbar 40, and each is engaged on a pin on its respective stands. Pin 46' is illustrated in FIG. 4 as engaging within the coil of spring 42. A similar construction is provided for spring 44. Springs 42 and 44 are configured to provide a substantially constant downward pull on crossbar 40 so that, within the limits of the structure, crossbar 40 has a substantially constant downward pull thereon.

Clamp bars 46 and 48 are rectangular bars which have lower clamping surfaces 50 and 52. They are secured onto the underside of rear crossbar 40 and extend forward and are attached to the underside of front crossbar 54. The length of the clamp bars is such that rear crossbar 40 lies behind rear fence 18, while front crossbar 54 lies in front of front fence 16. Thus, the crossbars span the entire distance between the fences. The fences have notches therein in order to receive the crossbars so that clamp surfaces 50 and 52 of the crossbars can closely approach the flat top surface 20 of table 12. Notches 56 and 58 are provided in the front crossbar 16, while notches 60 and 62 are provided in rear crossbar 18, see FIGS. 5 and 6.

Latch guides 64 and 66 are secured to the front of table 12. They act together to carry sliding latch block 68, see FIG. 4, in sliding relationship thereto. Coil spring 70 has its extended end secured to latch block 68, while its coil is engaged around pin 72. In this way, latch block 68 is urged downward toward the top surface of table 12, similarly to the stress imposed on rear crossbar 40. Latch pin 74 is spring-urged in the extended direction and engages in latch hole 76 in front crossbar 54. When thus engaged, the front crossbar 54 is pulled down toward the table to urge the clamp bars toward the table surface. When latch lever 78 is actuated to withdraw latch pin 74 from latch hole 76, then the clamp portion of the guide assembly can be raised, see the dashed lines in FIG. 2, to move or replace the workpiece.

Guide rails 80 and 82 are mounted parallel to each other, parallel to the clamping undersurfaces 50 and 52 of clamp bars 46 and 48 and are secured on their ends in rear crossbar 40 and front crossbar 54. Carriage 84 has front and rear guide bars 86 and 88 which, in turn, receive guide rails 80 and 82. The carriage is mounted for reciprocating guided motion on the guide rails to accurately follow the directional path defined by the guide rails. Suitable bushings are provided in the guide bars for accurate guiding on the guide rails.

Structure is provided so that router 26 can be detachably installed on carriage 84. Router 26 is a wood-working tool which is of a portable, electric motor driven hand tool. By its attachment onto guide assembly 24, the router cutter bit 90 is guided for cutting into the top surface of workpiece 22 parallel to the guide rails and to a depth determined by the adjustment of the router itself. Notches 92 and 94 are provided in fences 16 and 18 to pass the cutter bit without contact by the cutter bit to prevent damage to the cutter bit. Fence 18 is set forward of crossbar 40 so that the carriage may be moved to the rear with the cutter bit behind rear fence 18 so that the cutter bit starts behind the fence. Carriage clamp 96 can selectively clamp the carriage against sliding movement along its guide rails, should such a mode of operation be desired.

Operation of the router guide assembly 10 is convenient and accurate. Router 26 is clamped in place in carriage 84, and the desired cutter bit 90 is placed in the router spindle. Guide assembly 24 is raised after releasing latch pin 74. Workpiece 22 is thereupon placed on table 12, and in most cases, is laid against one of the fences 16 or 18. In the usual arrangement, guide rails 80 and 82 are at right angles to the fences so that the slot routed in the workpiece is at right angles to the fence against which the workpiece is lying. However, in special cases, it is clear that the fences could be oriented in other directions, depending on the requirements of the workpiece.

After the workpiece is in place, guide assembly 24 is lowered to engage the clamp bars 46 and 48 onto the top of the workpiece. The front end of the guide assembly is pulled down against the force of the rear coil springs, and latch block 68 is raised to engage latch pin 74 in latch hole 76. This pulls down the front end of guide assembly 24 to clamp the guide assembly across the workpiece. The upright slots in stands 28 and 30 permit the rear of the guide assembly to move up and down in accordance with the workpiece clamping requirements, but still maintain the accurate orientation of the guide rails so that accurate guiding is achieved. Router 26 is adjusted for proper depth and cut of cutter bit 90. Now, the router guide assembly 10 carrying router 26 is ready for routing workpiece 22. The carriage is manually drawn along the guide rails at a suitable feed rate, while bit 90 routes a groove across the top surface of workpiece 22 parallel to guide rails 80 and 82. When the routing stroke is completed, latch pin 74 is withdrawn, guide assembly 24 is raised, and the workpiece is moved or replaced. In this way, an inexpensive router guide assembly produces accurate routing cuts.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

I claim:

1. A router guide assembly comprising:
   a table;
   at least one fence secured to said table;
   two parallel guide rails;
   means for pivotally mounting said guide rails so that they can swing from an open position away from said table to an active position adjacent said table;
   a carriage movably mounted on said guide rails for carrying a router parallel to said guide rails for routing a workpiece positioned on said table;
   a front crossbar and a rear crossbar, said guide rails having ends engaged in said front and rear crossbars;
   said rear crossbar being pivotally mounted with respect to said table and slidably mounted in a direction toward and away from said table by means of a roller on each end of said rear crossbar engaging in an upright slot in a stand secured to said table.

2. The router guide assembly of claim 1 wherein there is also a clamp bar extending between said front and rear crossbars, said clamp bar being positioned to engage and clamp a workpiece with said guide rails positioned in active position with respect to said workpiece.

3. The router guide assembly of claim 2 wherein a spring is interconnected between said rear crossbar and said table for resiliently urging said rear crossbar toward said table for engaging said clamp bar against the workpiece to retain the workpiece with respect to said guide rails and said table.

4. A router guide assembly comprising:
   a table;
   at least one fence secured to said table;
   two guide rails;
   means for pivotally mounting said guide rails so that they can swing from an open position away from said table to an active position adjacent said table;
   a carriage movably mounted on said guide rails for carrying a router parallel to said guide rails for routing a work piece positioned on said table;
   a clamp bar and a front crossbar, said guide rails and said clamp bar being attached to said front crossbar;
   a latch block movably mounted with respect to said table in a direction away from the top of said table, said latch block being releasably engagable with said front crossbar so that said clamp bar and guide rails can be swung away from the table top when said latch block is released and said clamp bar is resiliently urged toward said table when said latch block is engaged.

5. The router guide assembly of claim 1 wherein a spring resiliently interconnects said latch block with said table to resiliently urge said latch block toward said table so that, when said front crossbar is connected to said latch block, said front crossbar is resiliently urged toward said table.

6. The router guide assembly of claim 5 wherein there are two clamp bars secured to said front crossbar to clamp a workpiece against said table and hold said guide rails spaced away from said table.

7. The router guide assembly of claim 6 wherein said guide rails and said clamp bars are secured to a rear crossbar, said rear crossbar being pivotally and slidably mounted in stands secured to said table so that said rear crossbar is movably mounted in the direction toward and away from said table.

8. The router guide assembly of claim 7 further including a spring resiliently interconnecting said rear crossbar and said table to resiliently urge said rear crossbar and said clamp bar carried thereby toward said table.

* * * * *